Sept. 25, 1923.
F. BADCOCK
1,468,952
IMPLEMENT FOR TRUING CRANK PINS AND EFFECTING LIKE OPERATIONS
Filed Feb. 16, 1922
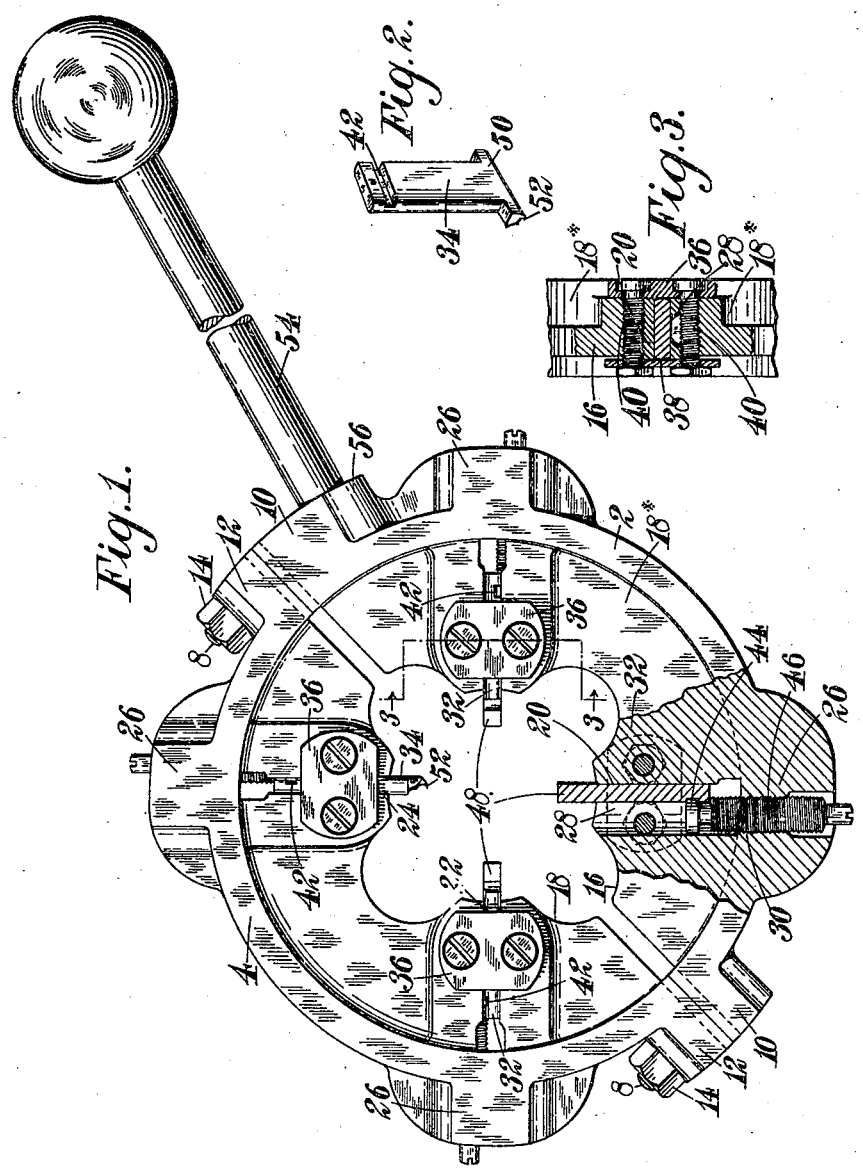

Patented Sept. 25, 1923.

1,468,952

UNITED STATES PATENT OFFICE.

FRED BADCOCK, OF LONDON, ENGLAND, ASSIGNOR OF ONE-HALF TO RICHARD WILLIS HILL KANE, OF LONDON, ENGLAND.

IMPLEMENT FOR TRUING CRANK PINS AND EFFECTING LIKE OPERATIONS.

Application filed February 16, 1922. Serial No. 536,886.

*To all whom it may concern:*

Be it known that I, FRED BADCOCK, a subject of the King of England, residing in London, England, have invented certain new and useful Improvements in Implements for Truing Crank Pins and Effecting like Operations, of which the following is a specification.

This invention is for improvements in or relating to implements for truing crank-pins and effecting like operations, and has for its object to provide a hand operated implement which can be readily placed round the crank-pin and rotated about the same to true it without having to mount the crank-shaft in any apparatus other than some means to hold it.

An implement according to the present invention comprises in combination a divided annular frame having the two parts rigidly secured together, two or more inwardly projecting guide-tools, and a single inwardly projecting cutting-tool opposed to the said guide-tools.

Preferably more than two guide-tools are employed and the cutting-tool is opposite one of said guide-tools which lies between two others. Thus in the example to be described hereinafter, there are three guide-tools spaced approximately 90° from each other, and the cutting-tool is opposite the central one of the three.

Means are provided, according to another feature of the invention, to adjust the tools towards and away from the centre of the implement independently of each other. For example the tools are mounted to slide in approximately radial guides and are adjustable therein by means of adjusting screws.

Other features of the invention consist in a special form of guides for the tool including a resilient guide-member, an advantageous arrangement in the frame of the cutting-tool and a particular shape thereof, and a particular relation between the operating handle and the cutting-tool, which ensure exact parallelism of the tools and a smooth cutting action without chattering. These features will be more particularly defined in the appended claims.

An implement according to this invention is illustrated in the accompanying drawings, in which—

Figure 1 is a side elevation of the implement with a part in section;

Figure 2 is a perspective view of the cutting-tool, and

Figure 3 is a section on the line 3—3 in Figure 2, looking in the direction of the arrow.

The frame of the implement comprises two castings 2, 4, of generally semi-circular shape having their meeting faces 6 machined to an accurate fit. Studs 8 are screwed into bosses 10 on the part 2 of the frame and extend through holes (which they fit accurately) in corresponding bosses 12 on the part 4. Nuts 14 are secured on the protruding ends of the studs 8, so that the two parts of the frame may be readily separated and re-assembled rigidly in exact register.

Each part of the frame has an inward centrally disposed web 16, 18 recessed as at $18^\times$ on one side for lightness, the faces of this web being machined flat and parallel. Two slots are cut in each web, and the central planes of the slots 20 in the web 16 are radial to the central axis of the frame, inclined to each other at 90° and to the meeting faces 6 at 45°.

The slot 22 in the web 18 also has its central plane radial and at 45° to the faces 6, but the other slot 24 has its central plane slightly displaced from, and parallel to, a radial plane inclined at 90° to the central plane of the slot 22.

The opposed faces of each slot are parallel, and all the slots extend from side to side of the webs. The frame is formed on its outer edge with bosses 26, one opposite each of the slots in the webs, and a hole 28 is drilled through each boss 26 and through the web, parallel to the corresponding slot and breaking through into it. A part 30 of each hole is of smaller diameter than the rest and is threaded to receive an adjusting screw to be described hereinafter.

The radial slots 20, 22 receive guide-tools 32, and the slot 24 receives cutting-tool 34. The thickness of the tools is such as to be a working fit in the slots, their width is slightly greater than the thickness of the webs, and their sides are slightly rounded, as shown in Figure 3. They are confined in the slots by guide-plates 36, 38 secured on either side of the webs by bolts 40 screwed into tapped holes in the webs. The plates 36 are sufficiently thick to be rigid, and are clamped firmly to the side of the web by the heads of the bolts. The plates 38 are of spring steel, and sufficiently thin (about 1⅛″) to act as stiff springs. The nuts of the bolts 40 are screwed down sufficiently tightly to press the plates 38 firmly against the slightly projecting sides of the tools. Being thus held tightly against the firm abutment provided by the plates 36, the tools are always held with their active faces perfectly parallel. By removing one of the guide-plates 38, a tool may be removed laterally.

A groove 42 is cut in one face of each tool near its outer end, which receives the shouldered end 44 of the adjusting screw 46, as shown in the sectional part of Figure 1. Each screw 46 is provided with a squared outer end to be engaged by a key whereby the tools may be adjusted radially in the slots as will be readily understood.

The end faces of the widened inner extremities 48 of the guide-tools 32 are plane surfaces perpendicular to the faces of the tools and parallel to the central axis of the implement. These faces are hardened to minimize wear.

The widened inner extremity 50 of the cutting-tool 34 is shaped to form a cutting edge which lies on or near the central plane of the tool itself and is parallel to the central axis of the implement. The extreme end face 52 of the tool, which forms the clearance face of the edge, is made perpendicular to the faces of the shank of the tool, the necessary clearance being provided by the displaced location of the tool, as will be readily understood. It will of course be appreciated that the cutting edge faces the radial plane parallel to the central plane of the tool, as shown in Figure 1.

An important advantage of the shape and location of the tool 34 is that if the tool bends slightly when taking a cut, the cutting edge recedes from the work by a very slight amount, thus preventing chattering and ensuring a smooth cut.

Further, the angle of the face 52 enables the tool to be sharpened in the following manner:— A square-edged oil-stone is placed on a flat surface, together with the tool, one of the faces of the shank of which rests on the flat surface. The face 52 is then brought against the edge of the oil-stone and rubbed along it with the oil-stone and tool kept firmly in contact with the flat surface. This ensures that the face 52 always remains perpendicular to the faces of the shank. To test whether the cutting edge is parallel to the central axis of the implement, a parallel-sided block is inserted between the cutting-tool and the opposite guide-tool, and the two tools are brought against the parallel sides of the block, when it can at once be seen whether the cutting-edge is in contact with the block along its whole length.

A removable handle 54 may be screwed into a socket 56 in the part 2 of the frame, the handle being about 60° in rear of the cutting-tool. This location of the handle has been found advantageous in obtaining a smooth cut and preventing chattering.

To use the implement in truing a crank-pin, the two parts 2, 4 of the frame are separated and re-assembled round the pin. The tools are then advanced inwards by means of the adjusting-screws until they touch the surface of the pin and the implement is rotated by means of the handle 54 and advanced along the pin until a cut has been taken along the whole of its length. The tools are then again advanced and the process repeated until the pin is truly circular.

To assist in adjusting the tools, a series of concentric circles (not shown in the drawing) is scribed on the unrecessed face of the webs 16, 18, and care is taken in adjusting the tools that their outer ends are approximately the same distance from one of the circles. This ensures that all the tools bear on the crank-pin or the like in the manner intended.

It is found that with this implement great accuracy can be obtained and the work is quickly carried out leaving the pin with a smooth finish.

Obviously, the implement is not restricted to its main use, namely, that of truing the pins of crank-shafts, but can be used to true any part of a shaft or other member by hand, for example, black shafting could be trued up by this implement at points where bearings are to be provided.

A further advantage of the independent adjustment of the guide-tools and cutting tool is that they enable a proper position to be found for the cutting-tool for all sizes of pin which the implement is intended to accommodate.

Although it is preferred to use three guide-tools and one cutting-tool, particularly in the case of crank-pins, other arrangements are within the scope of the invention. For example, two guide-tools only may be employed, the three tools being arranged at about 120° from each other.

I claim:—

1. In an implement for truing crank-pins and effecting like operations, the combination with an annular frame having a plurality of spaced parallel-sided slots extending approximately radially from the inner edge of said annular frame and open on both faces of said frame, of a plurality of inwardly-projecting tools having parallel-sided shanks each mounted to slide in one of said slots, a plurality of guide-plates secured to the faces of the frame to close the open sides of said slots and adapted to bear against the exposed sides of the shanks of the tools to guide them, and means for independently adjusting each tool lengthwise of the slot in which it is mounted.

2. In an implement for truing crank-pins and effecting like operations, the combination with an annular frame having a plurality of spaced parallel-sided slots extending approximately radially from the inner edge of said annular frame and open on both faces of said frame, of a plurality of inwardly-projecting tools having parallel-sided shanks each mounted to slide in one of said slots, the width of said shanks being slightly greater than the thickness of said frame at the slotted part thereof, a plurality of guide-plates rigidly secured to the frame to close the open sides of said slots on one side of the frame, and a plurality of resilient guide-plates secured to the other side of the frame and adapted to bear against the exposed and slightly projecting sides of the shanks of the tools on said other side.

3. In an implement for truing crank-pins and effecting like operations, the combination with a divided annular frame having a plurality of radial guide-ways and a non-radial guide-way opposed to one of said radial guide-ways, of means for rigidly securing the parts of said frame together, a plurality of inwardly-projecting guide-tools each mounted in one of said radial guide-ways, a single inwardly-projecting cutting-tool mounted in the non-radial guide-way, which latter is parallel to a plane radial to the central axis of rotation of the implement and slightly in rear thereof in relation to the direction of rotation of the implement, the cutting edge of the cutting tool lying in rear of that radial plane of the frame that extends through the longitudinal axis of the opposed guide-tool, and means for independently adjusting each guide-tool and the cutting-tool in said guide-ways.

4. In an implement for truing crank-pins and effecting like operations, the combination with a divided annular frame, of means for rigidly securing the parts thereof together, a plurality of inwardly-projecting guide-tools mounted in said frame, a single inwardly-projecting cutting-tool mounted opposite one of said guide-tools with its cutting edge in rear of that radial plane of the frame that extends through the longitudinal axis of the opposed guide-tool, and a radial handle secured to said frame in rear of said cutting-tool in relation to the direction of rotation of the implement.

5. In an implement for truing crank-pins and like operations, the combination with a divided annular frame, of means for rigidly securing the parts thereof together, a plurality of inwardly-projecting guide-tools mounted in said frame, and a single inwardly-projecting cutting-tool opposed to one of said guide-tools and having a shank mounted in said frame parallel to but slightly in rear of that radial plane of the implement which extends through the longitudinal axis of that guide-tool opposite the cutting-tool, said cutting-tool having the clearance face of its cutting edge perpendicular to the length of the shank.

6. An implement for truing crank-pins and effecting like operations, which comprises in combination a divided annular frame having four parallel-sided slots extending from the inner edge of said annular frame, open on both faces of said frame and spaced at angular intervals of approximately 90°, three of said slots being radial and the fourth non-radial, means for rigidly securing the parts of the frame together, four inwardly-projecting adjustable tools comprising three guide-tools and a cutting-tool, each having parallel-sided shanks mounted to slide in one of said slots, the width of said shanks being slightly greater than the thickness of said frame at the slotted part thereof, four guide-plates rigidly secured to the frame to close the open side of said slots on one side of said frame, four resilient guide-plates secured to the other side of the frame and adapted to bear against the exposed and slightly projecting sides of the shanks of the tools on said other side, means for independently adjusting each tool lengthwise in its slot, the cutting-tool being mounted in the non-radial slot with its cutting edge lying to the rear of that radial plane of the frame which extends through the longitudinal axis of the opposed guide-tool, and a radial handle secured to said frame in rear of said cutting-tool in relation to the direction of rotation of the implement.

In testimony whereof I have signed my name to this specification in the presence of two subscribing witnesses.

FRED BADCOCK.

Witnesses:
ARTHUR C. DUCOMBE,
REGINALD J. RIDGEWELL.